United States Patent
Nitsche et al.

[11] Patent Number: 6,114,066
[45] Date of Patent: Sep. 5, 2000

[54] METHOD OF PRODUCING LEAD STORAGE BATTERIES

[75] Inventors: Werner Nitsche, Lippstadt; Norbert Lahme; Günter Sassmannshausen, both of Brilon, all of Germany

[73] Assignee: Accumulatorenwerke Hoppecke Carl Zoellner & Sohn GmbH & Co. KG, Germany

[21] Appl. No.: 09/029,961

[22] PCT Filed: Apr. 22, 1997

[86] PCT No.: PCT/EP97/02018

§ 371 Date: Mar. 9, 1998

§ 102(e) Date: Mar. 9, 1998

[87] PCT Pub. No.: WO98/01915

PCT Pub. Date: Jan. 15, 1998

[30] Foreign Application Priority Data

Jul. 9, 1996 [DE] Germany ............. 196 27 616

[51] Int. Cl.[7] ............. H01M 4/73; H01M 6/00; B23P 13/00
[52] U.S. Cl. ............. 429/241; 429/242; 429/225; 429/233; 429/137; 29/2; 29/623.1
[58] Field of Search .............. 29/2; 429/241, 429/242, 131, 134, 136, 137

[56] References Cited

U.S. PATENT DOCUMENTS

| | | |
|---|---|---|
| 1,659,654 | 2/1928 | Hazelett . |
| 4,351,106 | 9/1982 | Brady ................................. 29/730 |
| 4,606,982 | 8/1986 | Nelson et al. . |

FOREIGN PATENT DOCUMENTS

| | | |
|---|---|---|
| 0105466 | 8/1987 | European Pat. Off. . |
| 0121786 | 2/1988 | European Pat. Off. . |
| 0451699 | 4/1991 | European Pat. Off. . |
| 2082092 | 8/1980 | United Kingdom . |
| 2 082 092 | 3/1982 | United Kingdom ............ H01M 4/73 |
| 2129193 | 10/1982 | United Kingdom . |
| 9006000 | 11/1988 | WIPO . |
| WO 90/06000 | 5/1990 | WIPO ............................ H01M 4/20 |

*Primary Examiner*—Marla Nuzzolillo
*Assistant Examiner*—Angela J. Martin
*Attorney, Agent, or Firm*—Robert W. Becker Associates

[57] ABSTRACT

A method and apparatus for producing lead storage batteries are provided. Essentially grid-shaped lead electrodes are produced and are provided with a pasty, active mass. Immediately thereafter separator material is provided on both sides of the electrodes. The electrodes are stacked, electrically connected, and placed in a housing to form a cell unit, which is subsequently stored to effect curing of the pasty, active mass.

17 Claims, 1 Drawing Sheet

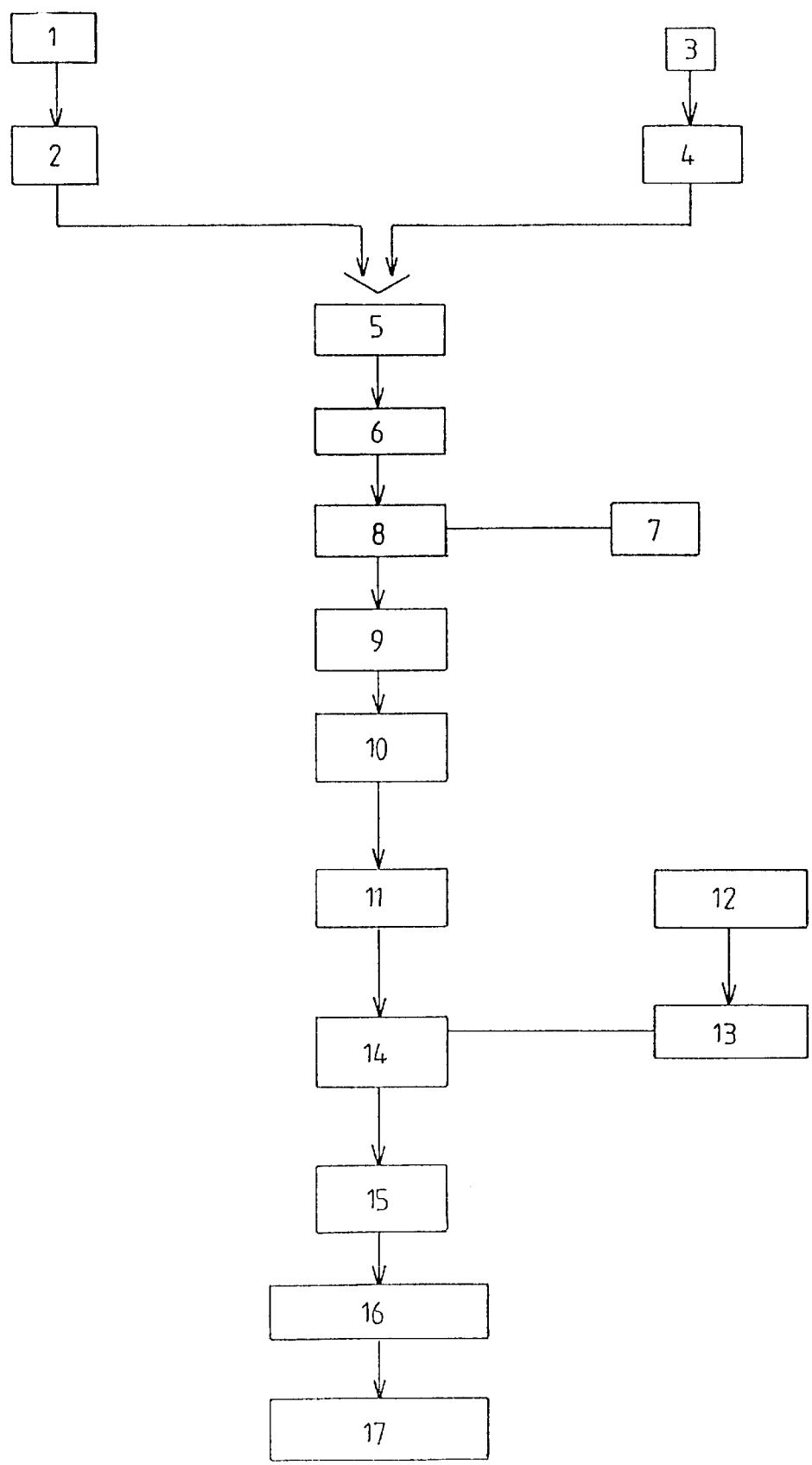

METHOD OF PRODUCING LEAD STORAGE BATTERIES

BACKGROUND OF THE INVENTION

The present invention relates to a method of producing lead storage batteries.

It is known for the manufacture of lead storage batteries, to first produce essentially grid-shaped lead electrodes. These resulting plates, with prescribed dimensions, are provided with a so-called active mass that is coated into the apertures of the grid. In a known manner, stacks are formed from the plates accompanied by the interposition of separator material, whereby a specific number of plates form a cell unit. These plates of a cell unit are electrically interconnected. A plurality of cell units are placed into appropriate housings or cases, similarly appropriately electrically connected, and finally connected to a positive and a negative pole. The storage battery must then be filled with acid and charged. The storage and the transport can take place in various states, for example after being charged the battery can then be emptied and is thus in a non-filled charged state. The battery can also be stored or transported in the filled and charged state.

The active mass is a pulpy, pasty mass that must cure accompanied by the addition of moisture. This takes place by the slow addition of water over a period of many hours. On the average, a curing process can take up to 24 hours.

This curing requirement stands in the way of endeavors to automate the manufacturing process of lead storage batteries as much as possible in an on-line operation.

It is customarily known to provide the lead electrodes with the active mass, to stack them and to deposit them for curing. The finished cured electrodes are then again introduced into the treating process, are provided with separator materials, are stacked, and for producing the storage batteries are further processed in the above described manner. If the curing phase is shortened, this can significantly adversely affect the later electrical characteristics of the storage battery. For example, if the plates have too great of a moisture content at the point in time when they are provided with separator material, this can lead to later shrinkage of the separator material due to change in moisture and can lead to increased ion drift from the plates into the separator material, which can significantly negatively influence the high-rate or deep discharge characteristics of a storage battery.

Starting from this state of the art, it is an object of the present invention of provide a method of producing lead storage batteries that without time losses enables an on-line operation and an as extensive as possible automation during the manufacture of lead storage batteries with good electrical characteristics. Furthermore, the invention provides an apparatus for carrying out the method, and a storage battery of a new generation is characterized.

SUMMARY OF THE INVENTION

For the technical realization of the object, a method of producing lead storage batteries is provided whereby essentially grid-shaped lead electrodes are produced, are provided with a pasty, active mass and immediately thereafter are provided on both sides with separator material, are stacked, are electrically connected, are placed in a housing to form a cell unit, and subsequently are stored to cure the pasty, active mass.

With the inventive method, the time consuming curing or drying process, which destroys an on-line process, is shifted to the end of the mechanical and assembly part of the manufacturing process. An appropriately stored storage battery with cured active mass is filled after the storage, is charged, is checked, is labeled, and the like. These are activating steps that have nothing more to do with the actual manufacturing process of a storage battery, but rather make the latter ready to operate.

Although active mass is referred to in general, the present invention relates in principle to the manufacture of a pasty positive or negative active mass. After the grid electrodes are provided with the positive or negative active mass, immediately thereafter respectively one of two lead electrodes, positive or negative, is provided on both sides with separator material, so that the positive and negative electrodes, which are filled with paste, are alternatingly stacked in a known manner to form plate units. The active mass, for example originally lead oxide, is first applied as a pasty mass without being electrochemically active. It is only during the electrochemical processes within the storage battery that there results from the paste the active mass, for example lead dioxide.

As a result of the inventive approach, the manufacturing process can be fully automated and can be carried out in the on-line operation starting from the manufacture of grid-shaped lead electrodes to the stacking of a storage battery that is equipped with cell units, is electrically connected, and is provided with poles. As a result of this now possible automation, the production capacity of a plant is considerably increased. Furthermore, personnel intensive operations are eliminated, such as the storage of lead electrodes that are provided with active mass, the resupply of dried lead electrodes to the further treating process, and the like.

It is particularly advantageously proposed with the present invention that after the production of the grid-shaped lead electrodes and the application of the pasty, active mass and the separator material, the moisture content be set to this total composite. This process feature is of particular significance. The separator materials are, for example, a polyethylene foil or thin sheet (PE foil) with silica embedments. The lead electrodes are, pursuant to one advantageous proposal of the present invention, cast in a continuous process so that so-called electrode coils result, in other words spools of electrodes that are present in band or sheet form and that were manufactured by means of a casting roller. The pasty, active mass can be directly applied in a similarly continuous process to this coil, i.e. to the cast band. Subsequently, the lead electrodes that are provided with active mass are separated and are separately inserted into pockets formed from the separator material. It is to be understood that the separation can also be effected directly by the manufacture of electrodes, or by separating a coil. To produce the pockets, the PE foil that is provided with silica is supplied from a roll and a respective pocket is formed accompanied by direct insertion of the electrode. In so doing, a foil strip is cut to size, is folded over accompanied by insertion of the electrode, and is closed off on two side edges via pressure.

Pursuant to one particularly advantageous proposal of the invention, the separator material, prior to being made into pockets, is stored for a prescribed period of time at increased temperatures, for example about 100° C. This thermal pretreatment of the separator material effectively counteracts a shrinkage of the separator material at a later point in time due to the absorption of moisture and subsequent drying.

As already indicated, a particularly important feature of the present invention is that the moisture content is set to the entire group comprising lead electrode, active mass applied thereto, and separator material. The ideal curing moisture content of the lead electrodes that are provided with active mass is 6 to 8%. The active mass is pasty and pulpy, and gives off moisture during the curing. The itself inert, porous separator material will absorb moisture and additionally extract further moisture from the plate, so that an ideal progressing of the curing process cannot be guaranteed. For this reason, the overall moisture content must also take into consideration the ability of the separator material to absorb moisture. To solve this problem, it is proposed pursuant to the present invention that the subassembly comprised of separator material and lead electrodes provided with active mass be soaked with liquid. Via this measure, the separator material can absorb moisture, so that at a later point in time it does not further dry out the active mass. In an advantageous manner the soaking takes place by immersion in a liquid. Water can in principle be used for this purpose since the concern is only for the required moisture content. However, pursuant to one advantageous specific embodiment of the present invention, it is proposed to soak the jacketed lead electrodes, which are provided with active mass, in acid, preferably sulfuric acid. By means of these measures, further particularly advantageous results are achieved. On the one hand, the acid treatment counteracts a later shrinkage of the separator material during later drying. As a result, the aforementioned thermal treatment can be eliminated or can be enhanced by the soaking in acid.

Furthermore, the soaking in sulfuric acid prevents an otherwise inherently occurring ion drift from the lead electrode into the separator material. As a result, the later deep discharge characteristic of the newly formed storage battery is considerably increased.

In an advantageous manner the subassemblies that are provided with the required moisture content and that comprise lead electrode, active mass and separator material, are stacked, are electrically connected, are placed in a housing, are electrically connected, and finally the finished storage battery is stored for the curing of the active mass.

The stacking can take place fully automatically and can also be shifted to a point in time prior to the soaking, in other words, can directly follow the formation of the pockets from separator material.

The present invention provides a method of producing lead storage batteries that enables a maximum degree of automation and manufacture in on-line operation. By shifting the curing process, which interrupts the on-line operation, to the end of the manufacturing and assembly process, the production capacities can be considerably increased. By means of the particular measure of setting the moisture content to the overall subassembly of lead electrode, active mass and separator material, an optimum curing of the active mass is also ensured in the condition where the electrode is provided with separator material, is stacked, and is built into a storage battery housing.

The present invention furthermore provides an apparatus for producing lead storage batteries pursuant to the inventive method, and comprises a casting unit for lead electrodes, a coating unit for applying the active mass, a unit for disposing separator materials, a soaking unit for setting the required moisture content as well as further units for preparing the cell units, for insertion into the housing, and further processing steps.

The casting unit and the coating unit are advantageously continuously operating units, so that the electrodes can be cast in strip or band form in an interconnected manner and in this band form, either with or without intermediate formation of coils, can also be coated with active mass. A separating unit separates the electrodes, and in the unit for applying the separator materials PE foil is supplied, is folded and the lead electrodes are inserted. At least two open side edges of the PE foil jackets are closed off by means of an edge pressing apparatus.

Finally, the apparatus includes a unit for setting the moisture content in the form of a soaking tank through which the jacketed lead electrodes are conveyed individually or already in stack form. The important thing is that the separator material is soaked. This process can possibly also be effected prior to the fabrication of the pockets.

The inventive apparatus of the inventive method comprises successive units for carrying out an automated on-line manufacturing process, whereby as an essential unit, a soaking unit or another unit for setting the required moisture content is incorporated.

A lead storage battery produced pursuant to the inventive method is a lead storage battery of a new generation that is provided with cured active mass in pockets and in stacked state. Such a storage battery has excellent technological characteristics and can never the less be economically produced in a cost-effective manner in a continuous on-line process.

From a procedural standpoint, the essential point of the present invention is the shifting of the time-consuming curing process to the end of the mechanical manufacturing and assembly process. Furthermore, a special feature of the invention is the setting of an overall moisture content for the subassembly comprising lead electrodes, active mass and separator material. In this connection, it is less important with which means and at which point in time the individual units are provided with appropriate moisture. For example, the entire manufacturing process could take place in a sufficiently moist environment, so that for example the separator material is provided with moisture from the environment. The separator material can also be pretreated, whereby the thermal treatment is a special feature for avoiding shrinkage. However, a separator material can also be prehydrated or presoaked in acid before it is made into a pocket that accommodates the lead electrode.

BRIEF DESCRIPTION OF THE DRAWING

Further advantages and features of the invention can be seen from the following description in conjunction with the drawing. Shown is:

FIG. 1 a flow diagram to clearly show the sequence of the individual manufacturing steps.

DESCRIPTION OF PREFERRED
EMBODIMENTS

On the whole, the manufacturing method includes the preparation of a number of raw materials and a number of finished parts. The raw materials include above all lead, which on the one hand is made into grid-shaped electrodes in a casting process, but which on the other hand is also used to produce the active mass, for example to produce lead oxide. Lead dioxide is then formed from the lead oxide in the electrochemical process. In addition, a separator material must be supplied to a suitable location, and finally a housing.

In the exemplary embodiment illustrated in FIG. 1, lead is smelted in a lead-smelting unit 1 and is made into grid electrodes in a grid casting process 2. This can be a continuous lead casting process from which issue lead electrodes that are interconnected in the shape of a band and/or strip. These electrode bands can be wound into coils or can be directly conveyed for further processing.

In connection with a lead preparation 3, lead is prepared for the manufacture of the active mass and in the mass or the material preparation step 4 the active mass is formed. Although in the illustrated embodiment the discussion is of only one lead preparation and one active mass, it is to be understood that parallel both positive as well as negative pasty masses are produced from which later the respective active masses result. The grid-shaped electrodes, which are produced in the grid casting step 2 and are supplied continuously or individually, and the active mass are combined in the coating step 5. In the illustrated embodiment, the assumption is made that electrode grids are conveyed in strip form and are separated only after the coating 5 in the separating step 6.

A supply 7 of foils or thin sheets sees to it that the separator material, for example PE foils having silica embedments, are supplied. The separator material can be pretreated by means of a thermal treatment. In the jacketing step 8, the lead electrodes, which have been separated and provided with active mass, are inserted into pockets formed by the foils. The pockets are subsequently provided with moisture in the soaking step 9 and are stacked at step 10. The stacking process can also take place prior to the soaking.

The stack, which forms a cell unit, and which of course is united according to the known manufacturing provisions to form a cell unit, is electrically connected to form a unit in a process step 11. By means of a housing supply 12, housings or cases are supplied to a housing preparation step 13. Here smaller preparation measures are carried out, for example punching of connection holes, deburring, to the extent necessary, etc. The housing that has been supplied with the sufficient number of cell units at 14 is supplied to a further process step 15 in which the individual cell units are electrically connected and the battery is provided with a positive pole and a negative pole.

In a following, important method step 16 the maturation or curing of the plates is effected by means of storage. The storage can take place under prescribed environmental conditions, for example at specific temperatures, moisture contents, and the like.

After curing, the storage battery is conveyed to the finishing stage 17. This includes, for example, the filling, the charging, the labeling, the preparation for transport, and the like.

It is to be understood that minor subsequent processing steps can also take place in the time period following the curing. For example, it can be expedient to electrically connect the cell units in a simple process and to provide them with poles only after the curing.

Furthermore, it is to be understood that the units are combined, stacked, and similarly processed taking into account known electro physical principles, and that appropriate measuring procedures and process controls are applied.

Variations of the method with respect to the sequence are within the scope of the present invention. The important thing is that the time consuming curing process, which interrupts every on-line processing, be shifted to the greatest extent to the end of the battery manufacture, and be aided by taking into account in particular a required moisture content.

The present invention is, of course, in no way restricted to the specific disclosure of the specification and drawing, but also encompasses any modifications within the scope of the appended claims.

List of Reference Numerals:

| | |
|---|---|
| 1 | Lead-smelting unit |
| 2 | Grid Casting |
| 3 | Lead preparation |
| 4 | Mass preparation |
| 5 | Coating |
| 6 | Separating |
| 7 | Foil supply |
| 8 | Jacketing |
| 9 | Soaking |
| 10 | Stacking |
| 11 | Connection |
| 12 | Housing supply |
| 13 | Housing preparation |
| 14 | Insertion |
| 15 | Connection |
| 16 | Curing of the plates |
| 17 | Finishing |

What we claim is:

1. A method of producing lead storage batteries, including the steps of:

producing essentially grid-shaped lead electrodes;

providing said electrodes with a pasty, active mass;

immediately thereafter providing separator material on each side of said electrodes;

soaking an overall subassembly comprising said grid-shaped lead electrode, said active mass and said separator material by immersion thereof in sulfuric acid;

thereafter stacking said electrodes;

electrically connecting said electrodes;

placing said electrodes into a housing to form a cell unit; and subsequently storing said cell unit to effect curing of said pasty active mass.

2. A method according to claim 1, wherein said lead electrodes are produced in a continuous casting process.

3. A method according to claim 1, wherein said active mass is applied to said grid-shaped lead electrodes in a continuous coating process.

4. A method according to claim 1, wherein individual, coated electrodes are disposed in pockets of said separator material.

5. A method according to claim 4, wherein said separator material pockets are formed from PE foil supplied from a roll.

6. A method according to claim 4, wherein said separator material is pretreated in a thermal treatment step.

7. A method according to claim 1, wherein said subassembly of lead electrode, active mass and separator material is moistened.

8. A method according to claim 1, wherein at least one of the following, namely stacking and electrical connection of lead electrodes provided with separator material, placement of cell units into said housing, and electrical connection of cell units placed in said housing, are effected automatically.

9. A method according to claim 8, wherein said step of storing said cell unit is effected in a final-assembled state of a storage battery.

10. An apparatus for producing lead storage batteries according to claim 1, comprising:

a lead casting unit to produce lead electrodes;

a coating unit for applying active mass to said electrodes;

a unit for disposing separator material on said electrodes;

means for preparing a subassembly of said electrodes, active mass and separator material and placing said subassembly into a housing; and a moistening unit.

11. An apparatus according to claim 10, wherein at least one of said lead casting unit and said coating unit is a continuously operating unit.

12. An apparatus according to claim 10, wherein a separating unit follows said coating unit.

13. An apparatus according to claim 10, wherein said unit for disposing separator material comprises a delivery means for a band-shaped foil, a folding unit and an insertion unit.

14. An apparatus according to claim 13, wherein said unit for disposing separator material also includes an edge pressing means.

15. An apparatus according to claim 10, wherein said moistening unit is a soaking tank.

16. An apparatus according to claim 10, which further comprises a sorting unit and a stacking unit.

17. A lead storage battery produced pursuant to the method of claim 1.

* * * * *